(12) United States Patent
Halpert et al.

(10) Patent No.: US 10,053,622 B2
(45) Date of Patent: *Aug. 21, 2018

(54) LIGHT EMITTING MATERIAL

(71) Applicant: Massachusetts Institute of Technology, Cambridge, MA (US)

(72) Inventors: Jonathan E. Halpert, Cambridge, MA (US); Jonathan Tischler, Sharon, MA (US); Moungi G. Bawendi, Cambridge, MA (US); Vladimir Bulovic, Lexington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,551

(22) Filed: Jul. 4, 2013

(65) Prior Publication Data

US 2014/0027680 A1  Jan. 30, 2014

Related U.S. Application Data

(63) Continuation of application No. 12/673,728, filed as application No. PCT/US2008/073197 on Aug. 14, 2008, now Pat. No. 8,480,927.

(60) Provisional application No. 60/935,530, filed on Aug. 17, 2007.

(51) Int. Cl.
| | | |
|---|---|---|
| *C09K 11/06* | (2006.01) | |
| *C09K 11/02* | (2006.01) | |
| *C09K 11/56* | (2006.01) | |
| *C09K 11/88* | (2006.01) | |

(52) U.S. Cl.
CPC ............ *C09K 11/06* (2013.01); *C09K 11/025* (2013.01); *C09K 11/565* (2013.01); *C09K 11/883* (2013.01); *C09K 2211/10* (2013.01)

(58) Field of Classification Search
CPC ..... C09K 11/06; C09K 11/565; C09K 11/883; C09K 2211/10
USPC ......... 252/301.16, 301.4 R, 301.4 S, 301.6 S
See application file for complete search history.

(56) References Cited

U.S. PATENT DOCUMENTS

| | | | |
|---|---|---|---|
| 8,158,444 B2 * | 4/2012 | Gaylord et al. ............. | 436/546 |
| 8,480,927 B2 * | 7/2013 | Halpert et al. ........... | 252/301.16 |

FOREIGN PATENT DOCUMENTS

WO  WO 2007/021757  *  2/2007

* cited by examiner

*Primary Examiner* — C Melissa Koslow
(74) *Attorney, Agent, or Firm* — Steptoe & Johnson LLP

(57) ABSTRACT

A composition can include a first moiety capable of being excited to an excited state, and a second moiety capable of accepting excited state energy from the first moiety. The second moiety is capable of emitting light with a FWHM of 15 nm or less when excited. The second moiety can be a J-aggregate and the first moiety can be a semiconductor nanocrystal.

9 Claims, 10 Drawing Sheets

LIGHT EMITTING MATERIAL

CLAIM OF PRIORITY

This application claims priority to U.S. application Ser. No. 12/673,728, filed on Feb. 16, 2010, now U.S. Pat. No. 8,480,927, which claims priority to U.S. Provisional Application Ser. No. 60/935,530, filed on Aug. 17, 2007, each of which is incorporated by reference in its entirety.

TECHNICAL FIELD

The present invention relates to a light emitting material.

BACKGROUND

Light-emitting devices can be used, for example, in displays (e.g., flat-panel displays), screens (e.g., computer screens), and other items that require illumination. Accordingly, the brightness of the light-emitting device is one important feature of the device. Also, low operating voltages and high efficiencies can improve the viability of producing emissive devices.

Light-emitting devices can release photons in response to excitation of an active component of the device. Emission can be stimulated by applying a voltage across the active component (e.g., an electroluminescent component) of the device. The electroluminescent component can be a polymer, such as a conjugated organic polymer or a polymer containing electroluminescent moieties or layers of organic molecules. Typically, the emission can occur by radiative recombination of an excited charge between layers of a device. The emitted light has an emission profile that includes a maximum emission wavelength, and an emission intensity, measured in luminance (candelas/square meter ($cd/m^2$) or power flux ($W/m^2$)). The emission profile, and other physical characteristics of the device, can be altered by the electronic structure (e.g., energy gaps) of the material. For example, the brightness, range of color, efficiency, operating voltage, and operating half-lives of light-emitting devices can vary based on the structure of the device.

SUMMARY

In general, a light-emitting material can have a broad absorption profile and a narrow emission profile. Certain monomeric materials aggregate ("J-aggregates"), and in the aggregate form undergo aligned dipole-dipole interactions that result in extremely strong absorption and emission characteristics. Advantageously, J-aggregates can be noncovalently associated with semiconductor nanocrystals (e.g. electrostatically associated). The associated constructs can have beneficial optical properties including broadband absorption across the UV and blue portions of the spectrum. When associated, the nanocrystal/J-aggregate complex can be excited by UV light (exciting the nanocrystal). The nanocrystal can transfer energy to the J-aggregate, such that the complex has the emission profile of the J-aggregate. Thus, the complex absorbs like a nanocrystal and emits like a J-aggregate, making use of features of both materials.

One application of such material can be in optoelectronic and optical applications, where the conjugate could be deposited onto a substrate and excited with either higher energy photons (photoluminescent, PL) or by injecting charge carriers in a PIN junction scheme (electroluminescence, EL) using the conjugate as the active layer. In a PL setup, the absorption characteristics of the nanocrystals would be ideal for harvesting the incident photons and transferring energy to the aggregate which would emit with a very narrow emission peak, allowing such an emitter to hit the extreme points of the CIE diagram and thus enlarge the area on the diagram which would be accessible to an RGB display. The ability of the nanocrystal to absorb photons and transfer excitons to the dye may also allow for a lower lasing threshold for the dye, which could be pumped at wavelengths that would not interact with the aggregate, thus preventing photobleaching. This could find use in LCD style displays, or as lasing media in photodiode lasers.

Another application can be in biological applications such as protein labeling, or genome sequencing in which the thin emission linewidth of the dye could aid in better spectral resolution, thus allowing a greater degree of multiplexing, using numerous dye-nanocrystal conjugates, than could be achieved with semiconductor nanocrystals alone. This would also present an advantage over traditional dyes in that many conjugates could all be excited with a single near UV source (such as mercury lamp), since all nanocrystals absorb well across the UV spectrum. Once again, this would also avoid the problem of photobleaching the dye, by using wavelengths that would interact with the absorption features of the nanocrystal, but not the dye. Furthermore, other J-aggregating dyes with near infrared emission wavelengths could be used for in vivo imaging in humans.

In one aspect, a composition includes a first moiety capable of absorbing a first wavelength of light and emitting a second wavelength of light and a second moiety capable of absorbing a third wavelength of light and emitting a fourth wavelength of light, where the first and second moieties are associated electrostatically.

The second moiety can be capable of absorbing the second wavelength of light. The first moiety can be capable of absorbing the fourth wavelength of light. The first moiety can be a semiconductor nanocrystal. The second moiety can be a J-aggregate.

In another aspect, a composition includes a first moiety capable of being excited to an excited state, and a second moiety capable of accepting excited state energy from the first moiety. The second moiety can be capable of emitting light with a FWHM of 15 nm or less when excited.

The first and second moieties can be associated electrostatically. The second moiety can be a J-aggregate. The first moiety can be a semiconductor nanocrystal. The semiconductor nanocrystal can include an outer layer including a compound having a functional group capable of bearing an electrostatic charge. The compound can also include a functional group having an affinity for a surface of the semiconductor nanocrystal.

In another aspect, a method of making a composition includes contacting a first moiety capable of being excited to an excited state bearing a first electrostatic charge with a second moiety capable of accepting excited state energy from the first moiety and bearing an opposite electrostatic charge. The second moiety can be capable of emitting light with a FWHM of 15 nm or less when excited.

In another aspect, a method of generating light of a predetermined wavelength, includes exciting a composition including a first moiety capable of being excited to an excited state and a second moiety capable of accepting excited state energy from the first moiety. The second moiety can be capable of emitting light with a FWHM of 15 nm or less when excited.

Exciting can include illuminating the composition with an excitation wavelength of light. Exciting can include electrically exciting the composition.

Other features, objects, and advantages will be apparent from the description and drawings, and from the claims.

DESCRIPTION OF DRAWINGS

FIG. 4 (inset) is a graph depicting optical properties of different materials.

DETAILED DESCRIPTION

Figure 1:
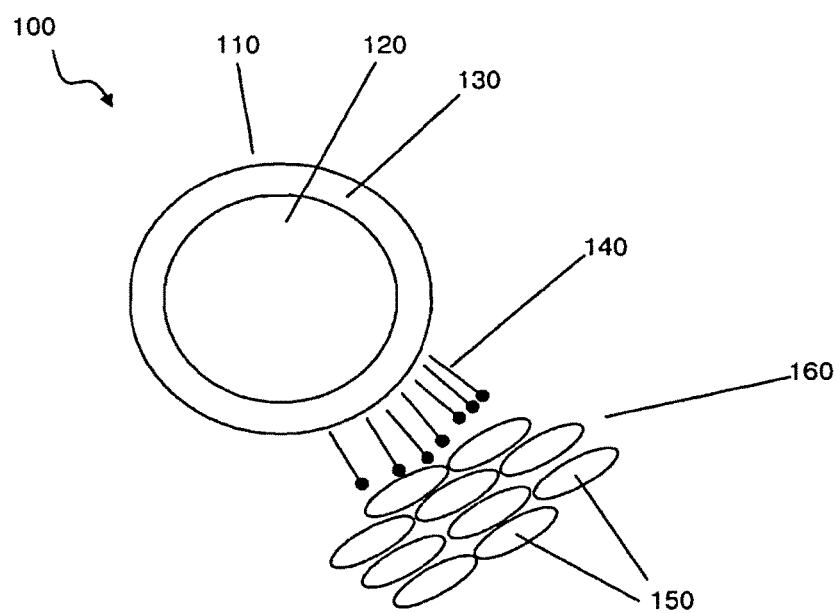
FIG. 1 is a schematic depiction of a composition.

In general, a light emitting material can be capable of absorbing light at a first wavelength and subsequently emitting light at a second wavelength. In some materials, the absorption and emission occur on different moieties. A first moiety can absorb light at an absorption wavelength, thereby achieving a higher energy excited state. The excited moiety can transfer energy (e.g. by Forster resonance energy transfer or FRET, or another energy-transfer mechanism) to a second moiety. The second moiety thus achieves an excited state capable of emitting light at an emission wavelength. In many cases, the first moiety can achieve its excited state by other means than absorption of light, such as electrical excitation or energy transfer from other excited species. The efficiency of energy transfer can depend on (among other factors) the distance between the first and second moieties.

The moieties can be associated with one another by a covalent or non-covalent interaction. Non-covalent interactions include but are not limited to hydrogen bonding, electrostatic attraction, hydrophobic interactions, and aromatic stacking interactions. In some cases, electrostatic interactions can be favorable, for example, when one moiety bears (or is capable of bearing) a charge.

One example of a light-emitting moiety is a J-aggregating material (for example, a cyanine dye). The J-aggregating material can have individual dipoles that can couple together to produce a coherent quantum mechanical state (a j-band state). These j-band states are known to absorb and emit light with a very narrow full width half max (FWHM) of 15 nm or less, sometimes as small as 5 nm. J-aggregates are generally charged; the charged nature of the J-aggregated can be exploited to form electrostatically associated conjugates with other materials capable of undergoing energy transfer with the J-aggregate.

The semiconductor nanocrystals can have a broad absorption band with an intense, narrow band emission. The peak wavelength of emission can be tuned from throughout the visible and infrared regions, depending on the size, shape, composition, and structural configuration of the nanocrystals. The nanocrystals can be prepared with an outer surface having desired chemical characteristics (such as a desired solubility). Light emission by nanocrystals can be stable for long periods of time.

When a nanocrystal achieves an excited state (or in other words, an exciton is located on the nanocrystal), emission can occur at an emission wavelength. The emission has a frequency that corresponds to the band gap of the quantum confined semiconductor material. The band gap is a function of the size of the nanocrystal. Nanocrystals having small diameters can have properties intermediate between molecular and bulk forms of matter. For example, nanocrystals based on semiconductor materials having small diameters can exhibit quantum confinement of both the electron and hole in all three dimensions, which leads to an increase in the effective band gap of the material with decreasing crystallite size. Consequently, both the optical absorption and emission of nanocrystals shift to the blue, or to higher energies, as the size of the crystallites decreases.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region. The narrow size distribution of a population of nanocrystals can result in emission of light in a narrow spectral range. The population can be monodisperse and can exhibit less than a 15% rms deviation in diameter of the nanocrystals, preferably less than 10%, more preferably less than 5%. Spectral emissions in a narrow range of no greater than about 75 nm, preferably 60 nm, more preferably 40 nm, and most preferably 30 nm full width at half max (FWHM) for nanocrystals that emit in the visible can be observed. IR-emitting nanocrystals can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of nanocrystal diameters decreases. Semiconductor nanocrystals can have high emission quantum efficiencies such as greater than 10%, 20%, 30%, 40%, 50%, 60%, 70%, or 80%.

The semiconductor forming the nanocrystals can include a Group II-VI compound, a Group II-V compound, a Group III-VI compound, a Group III-V compound, a Group IV-VI compound, a Group I-III-VI compound, a Group II-IV-VI compound, or a Group II-IV-V compound, for example. ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

Methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals. Preparation and manipulation of nanocrystals are described, for example, in U.S. Pat. Nos. 6,322,901 and 6,576,291, and U.S. Patent Application No. 60/550,314, each of which is incorporated by reference in its entirety. The method of manufacturing a nanocrystal is a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened.

The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ((TMS)$_2$Se), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTe), bis(trimethylsilyl)telluride ((TMS)$_2$Te), bis(trimethylsilyl)sulfide ((TMS)$_2$S), a trialkyl phosphine sulfide such as (tri-n-octylphosphine)sulfide (TOPS), an ammonium salt such as an ammonium halide (e.g., NH$_4$Cl), tris(trimethylsilyl)phosphide ((TMS)$_3$P), tris(trimethylsilyl) arsenide ((TMS)$_3$As), or tris(trimethylsilyl) antimonide ((TMS)$_3$Sb). In certain embodiments, the M donor and the X donor can be moieties within the same molecule.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group I-III-VI compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

The outer surface of the nanocrystal can include compounds derived from the coordinating solvent used during the growth process. The surface can be modified by repeated exposure to an excess of a competing coordinating group. For example, a dispersion of the capped nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

For example, the outer surface of the nanocrystal can include a polyacrylate moiety that has multiple negative charges when in aqueous solution. See, for example, WO/2007/021757, which is incorporated by reference in its entirety.

Thin films having a high oscillator strength (i.e., absorption coefficient) can be made by alternately adsorbing two or more materials capable of non-covalent interaction onto a support or substrate from solution, where one material is a light absorbing material. The non-covalent interaction can be, for example, an electrostatic interaction or hydrogen bonding. Selection of appropriate materials and assembly conditions can result in a film where the light absorbing material participates in strong dipole-dipole interactions, favoring a high absorption coefficient. The light absorbing material can be a dye capable of forming a J-aggregate. See, for example, WO/2007/018570, which is incorporated by reference in its entirety. Such films can also be included in light emitting devices. See, for example, WO/2006/137924, which is incorporated by reference in its entirety.

Layers of light absorbing material, which can be positively or negatively charged, can be interspersed with layers of an oppositely charged material. The oppositely charged material can include a multiply charged species. A multiply charged species can have a plurality of charge sites each bearing a partial, single, or multiple charge; or a single charge site bearing a multiple charge. A polyelectrolyte, for example, can have a plurality of charge sites each bearing a partial, single, or multiple charge. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS), polyacrylic acid, or a salt thereof. Some polyelectrolytes can lose their charge (i.e., become electrically neutral) depending on conditions such as pH. Some polyelectrolytes, such as copolymers, can include both polycationic segments and polyanionic segments. The charge density of a polyelectrolyte in aqueous solution can be pH insensitive (i.e., a strong polyelectrolyte) or pH sensitive (i.e. a weak polyelectrolyte). Without limitation, some exemplary polyelectrolytes are poly diallyldimethylammonium chloride (PDAC, a strong polycation), poly allylamine hydrochloride (PAH, a weak polycation), sulfonated polystyrene (SPS, a strong polyanion), and poly acrylic acid (PAA, a weak polyanion). Examples of a single charge site bearing a multiple charge include multiply charged metal ions, such as, without limitation, $Mg^{2+}$, $Ca^{2+}$, $Zn^{2+}$, $Fe^{2+}$, $Fe^{3+}$, $Co^{2+}$, $Cu^{2+}$, $Cd^{2+}$, $Sn^{4+}$, $Eu^{3+}$, $Tb^{3+}$, and the like. Multiply charged metal ions are available as salts, e.g. chloride salts such as $CoCl_2$, $FeCl_3$, $EuCl_3$, $TbCl_3$, $CdCl_2$, and $SnCl_4$.

The film can include hydrogen bonding polymers, such as, for example, polyacrylamide (PAm), polyvinylpyrolidone (PVP), and polyvinyl alcohol (PVA). The light absorbing film can include more than two materials. One of these materials is the light absorbing material and one of the other materials is either a multivalent ionic species or hydrogen bonding polymer. Additional materials may be included in the film to promote crosslinking, adhesion, or to sensitize light emission or absorption.

The thin films can include one or several layers of a polyelectrolyte and one or more charged species with strong dipole-dipole interactions and any additional dopants. At least one of the charged species used for strong dipole-dipole interactions has a charge opposite that of the polyelectrolyte used for the scaffold. When sequentially applied to a substrate, the oppositely charged materials attract forming an electrostatic bilayer. The polyelectrolyte provides a scaffold for the species with strong dipole-dipole interactions to form a layered structure. These films are compatible with other processes of building thin films through alternate adsorption of charged species. The films can be interspersed in a multifilm heterostructure with other thin films.

The charged species with strong dipole-dipole interactions can be a single type of species, such as a single type of J-aggregating material (for example, a cyanine dye). Alternatively, several charged species with strong dipole-dipole interactions among the species could be used. The species used for the strong dipole-dipole interacting layer can have individual dipoles that can couple together to produce a coherent quantum mechanical state. This allows for the buildup of coherence in two dimensions, producing effects in the probe dimension perpendicular to the interacting species.

The J-aggregation effect is made possible by the flat, elongated morphology of the cyanine dye, which controls packing, and the presence of a strong dipole formed from a conjugated pi system that forms the backbone of the molecule. The dye 1,1',3,3'-tetraethyl-5,5',6,6'-tetrachlorobenzimidazolo-carbocyanine chloride (TTBC) has been proposed to occur in a "herringbone" or "staircase" type arrangement. See, e.g., Birkan, B.; Gulen, D.; Ozcelik, S. *Journal of Physical Chemistry B* 2006, 110, 10805-10813, which is incorporated by reference in its entirety. When the dye monomers are positioned and aligned such that their optical transition dipoles couple strongly and constructively, the aggregates form the collectively emitting J-band state, whose signature photoluminescence (PL) spectrum is red-shifted and considerably narrower than the PL of the monomer. See, for example, Vanburgel, M.; Wiersma, D. A.; Duppen, K. *Journal of Chemical Physics* 1995, 102, 20-33; and Knoester, J. *Journal of Chemical Physics* 1993, 99, 8466-8479, each of which is incorporated by reference in its entirety.

These cyanine dyes often occur as organic salts (Mishra, A.; et al., *Chem. Rev.* 2000, 100, 1973-2011, which is incorporated by reference in its entirety). Typically, the lumophore component is positively charged due to the partial positive charge on the amine moieties that are coupled to the conjugated pi system that forms the color center of the molecule. The lumophore may instead be negatively charged overall. The resulting J-aggregates are nanoscale charged species generally dispersible in a number of polar solvents, including water and alcohols. Solvent choices can be limited by the conditions required to promote aggregation. These ionic species have been previously shown to adsorb readily onto a charged surface (Fukumoto, Y. Yonezawa, *Thin Solid Films* 1998, 329; and Bradley, M. S. et al., *Advanced Materials* 2005, 17, 1881) to AgBr nanocrystalline grains (Rubtsov, I. V.; et al. *J. Phys. Chem. A* 2002, 106, 2795-2802), and to charged Au nanocrystals in solution (Lim, I.-I. S.; et al., *J. Phys. Chem. B* 2006, 110, 6673-6682) (each of which is incorporated by reference in its entirety). They have also been shown to be efficient FRET acceptors and donors when assembled above a film of layer-by-layer deposited polyelectrolyte-CdSe/ZnS nanocrystal monolayers (Zhang, Q.; et al., *Nat Nano* 2007, 2, 555-559, which is incorporated by reference in its entirety). Electrostatic synthesis of complex compounds involving nanocrystals has also been demonstrated using dihydrolipoic acid (DHLA) coated, negatively charged nanocrystals and positively charged polypeptides such as a leucine zipper (see, for example, Mattoussi, H.; et al., *J. Am. Chem. Soc.* 2000, 122, 12142-12150, which is incorporated by reference in its entirety).

J-aggregates of cyanine dyes have long been known for their strong fluorescence. This strong fluorescence makes J-aggregates a desirable candidate for use in organic light-emitting devices (OLEDs), and these devices have been demonstrated. The layer-by-layer (LBL) technique for film growth, first developed by Decher et al., was extended to create thin films of J-aggregates, which have been to create an OLED with J-aggregates as emitters. See, for example, E. E. Jelley, Nature 1936, 138, 1009; M. Era, C. Adachi, T. Tsutsui, S. Saito, Chem. Phys. Lett. 1991, 178, 488; G. Decher, J. D. Hong, J. Schmitt, Thin Solid Films 1992, 210, 831; H. Fukumoto, Y. Yonezawa, Thin Solid Films 1998, 329, 748; S. Bourbon, M. Y. Gao, S. Kirstein, Synthetic Metals 1999, 101, 152; Bradley, M. S. et al., Advanced Materials 2005, 17, 1881; and provisional U.S. Patent Application No. 60/624,187, filed Nov. 3, 2004, each of which is incorporated by reference in its entirety.

FIG. 1 illustrates a composition 100 including a semiconductor nanocrystal 110 and an associated J-aggregated 160. Semiconductor nanocrystal 110 includes a core 120, overcoating 130, and an outer layer 140. In FIG. 1, outer layer 140 is shown on only a portion of a surface of nanocrystal 110, but the outer layer can coat a portion or the entire surface. The compounds in outer layer 140 includes a moiety having a non-covalent interaction with monomers 150. Monomers 150 are aggregated together into J-aggregate 160. In some embodiments, the non-covalent interaction is an electrostatic interaction, in which the moieties in the outer layer 140 have a charge opposite that of monomers 150.

Figure 2:
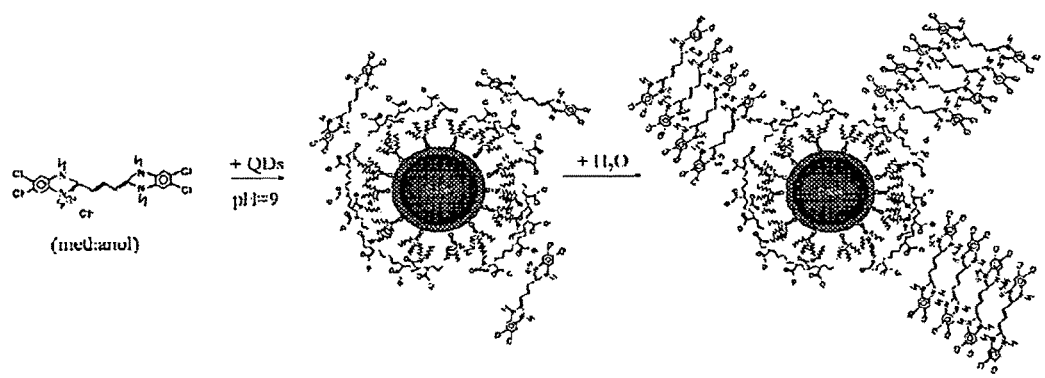
FIG. 2 is a schematic depiction of a composition and method of making the composition.

FIG. 2 illustrates a method of preparing a nanocrystal/J-aggregate construct. A cationic dye capable of forming J-aggregates (e.g. 1,1'-3,3'-tetraethyl-5,5',6,6'-tetrachlorobenzimidazolocarbocyanine chloride (TTBC)) is dissolved in methanol and added to a solution of nanocrystals in a water/methanol solution at basic pH. The nanocrystals have an outer layer bearing acidic functional groups. Because the solution is at a basic pH, the acidic functional groups bear negative charges. As water is added to the solution, the dye begins to form J-aggregates which are associated with the nanocrystals by virtue of electrostatic attraction between acidic functional groups and the cationic dye molecules.

Examples

To create these conjugates, charged semiconductor nanocrystals were rendered soluble in a water/methanol solution, and a charged cyanine dye molecule selected that can undergo aggregation. ZnSe/CdSe semiconductor nanocrystals that emit in the visible were synthesized using known methods modified to produce nanocrystals emitting at the selected wavelength (555 nm). These nanocrystals were then overcoated using known methods with a higher band gap material, in this case ZnS. Although these materials were chosen for their ease of production, brightness, and spectral range, other nanocrystals with similar spectral ranges including CdSe/ZnS, ZnCdSe/ZnS, CdSeTe/ZnS can also be used. The nanocrystals were then coated with an octylamine-modified polyacrylic acid which forms a protective outer layer around the nanocrystal with the amine functionality being associated with a nanocrystal surface, and the acid functionality pointing outward in solution. See, for example, WO/2007/021757, which is incorporated by reference in its entirety. These modified nanocrystals dissolved readily in polar solvents such as DMF, chloroform, methanol and ethanol as well as water which has been buffered to a basic pH (pH 8-10) with borate buffer. This dissociated the proton on the acid groups, creating a negatively charged species that readily dissolved in water and was ionically attracted to positively charged cyanine dyes.

Chemicals.

Monomer dye 1,1',3,3'-tetraethyl-5,5',6,6'-tetrachlorobenzimidazolocarbocyanine (TTBC) was purchased from Charkit Chemical Corporation, as well as the anionic dye 5,6-dichloro-2-[3-[5,6-dichloro-1-ethyl-3-(3-sulfo-ropyl)-2(3H)-benzimidazolidene]-1-propenyl]-1-ethyl-3-(3-sulfo-propyl)benzimidazolium hydroxide, inner salt, sodium salt (BIC). Trioctylphosphine oxide (TOPO, 99% and technical grade), hexadecylamine (HDA), selenium shot, hexamethyldisilathiane ($TMS_2$—S) dimethylformamide (DMF, anhydrous), octylamine (95%), decylamine (96%), polyacrylic acid (200 MW), sodium hydroxide, hydrochloric acid (conc.), ethyl acetate, hexane, butanol, methanol and chloroform were all purchased from Aldrich. Trioctylphosphine (TOP, 98%) and cadmium 2,4-pentanedionate (99%) were purchased from Strem. Hexylphosphonic acid (HPA, 99%) and tetramethylammonium hydroxide pentahydrate were purchased from Alpha Aesar. Diethyl zinc and dimethyl cadmium were purchased from Strem and filtered through a 0.2 μm filter prior to use. 1-Ethyl-3-(3-dimethylaminopropyl)carbodiimide hydrochloride (EDC, 99%) was purchased from Fluka. Trioctylphosphine selenide (1.5 M TOP-Se) was produced by stirring selenium shot in trioctylphosphine overnight.

Nanocrystal Synthesis.

ZnSe/CdSe/ZnS nanocrystals were synthesized using to known methods. To make ZnSe nanocrystals, HDA was degassed in a 3-neck roundbottom flask at 110° C., after which it was heated under Ar to 300° C. and a solution of 96 mg of diethyl zinc, 0.28 mL of TOP-Se and 4.72 ml of TOP was injected into the flask and heated at 270° C. for 1.5 hrs before cooling to 150° C. Meanwhile a 4-neck flask with 8 g of TOPO and 0.4 g of HPA was degassed at 160° C. before cooling under Ar to 150° C. and injecting 4 mL of the ZnSe nanocrystal solution. Immediately upon injection, a solution of 78 mg of dimethyl cadmium, 0.16 mL of TOP-Se and 4.84 mL of TOP was added to the flask dropwise at a rate of 1 drop per second. The solution was then held at 150° C. for 19 hours until the emission peak was stable at 532 nm. The nanocrystals were then precipitated twice by addition of butanol and methanol, and then redispersed after each precipitation in hexane. This solution was then added to a 4-neck flask containing a solution of 10 g TOPO and 0.4 g HPA which had been degassed at 160° C., then cooled to 80° C. After removing hexane by vacuum, the flask was heated under Ar to 155° C. and two solutions, one of 6 mg dimethyl cadmium, 49 mg diethyl zinc in 5 mL of TOP and the other of 160 mg $TMS_2$—S in 5 mL of TOP, were simultaneously added at a rate of 1.5 mL per hour by syringe pump. After this, the nanocrystals were cooled and precipitated twice from solution by the addition of butanol and methanol, and then redispersed in chloroform. The $\lambda_{max}$ of the final nanocrystals was 555 nm. Quantum yield of the completed nanocrystals in chloroform was found to be ~50% using to Coumarin 540 (QY=89% in ethanol) as a reference.

CdSe/ZnS nanocrystals were synthesized by known methods. In a 3-neck 50 ml roundbottom flask, 3.25 g of TOPO (99%), 3.0 g of TOPO (tech.) and 5.75 g of HDA, and 0.28 g of HPA were degassed at 160° C. before heating under Ar to 360° C. A solution of 0.31 g of cadmium 2,4-pentadionate, 0.5 mL of DDA, in 8 mL of TOP was degassed at 110° C. prior to cooling and adding 2 mL of 1.5 M TOP-Se. This solution was then injected into the flask at 360° C. and immediately cooled. The CdSe nanocrystals were then precipitated from solution twice with butanol and methanol, redispersing each time in hexane. This solution was then added to a 4-neck flask containing a solution of 10 g TOPO and 0.4 g HPA which had been degassed at 160° C., then cooled to 80° C. After removing hexane by vacuum, the flask was heated under Ar to 100° C. and 0.5 mL of decylamine was added and the solution stirred for 1 hour. After this, the flask was heated to 170° C. and two solutions, one of 18 mg dimethyl cadmium, 72 mg diethyl zinc in 5 mL of TOP and the other of 252 mg $TMS_2$—S in 5 mL of TOP, were simultaneously added at a rate of 1.5 mL per hour by syringe pump. The nanocrystals were then cooled and precipitated from solution by the addition of butanol and methanol, and then dried under vacuum to remove all solvent. The $\lambda_{max}$ of the final nanocrystals was 570 nm. Quantum yield of the completed nanocrystals in chloroform was found to be ~30% using Rhodamine 590 (QY=89% in ethanol) as a reference.

Synthesis of Anionic Polymers.

The synthesis was adapted from those previously reported (see, e.g., Wu, X.; et al. *Nature: Biotechnology* 2003, 21, 41-46, which is incorporated by reference in its entirety). In a 250 mL 1-neck flask, 1.000 g of polyacrylic acid (2000 MW) was dissolved in 10 mL of DMF prior to adding a solution of 1.333 g of EDC in 60 mL of DMF. Slowly, while stirring, 0.91 mL of octylamine was added dropwise to the flask and the solution stirred overnight. DMF was removed by vacuum until the total amount of solvent in the pot was ~5 mL. At this time, DI water was added until the polymer precipitated from solution and the supernatant was removed and discarded. 30 mL of DI water was then added to the pot and stirred with 4 g of tetramethylammonium hydroxide. 30 mL of ethyl acetate was then added to form two phases and the solution was stirred overnight. The mixture was then placed in a separation funnel, allowed to separate and the aqueous fraction was retained. Any remaining ethyl acetate in the aqueous solution was then removed under vacuum. Approximately 10 mL of 3 M HCl was then added to precipitate the polymer which was then centrifuged at 3900 RPM to remove the precipitate and redisperse it in 30 mL of DI so water to which had been added 800 mg of NaOH. The solution was vortexed and left to sit for a day to redisperse. Again ~10 mL of 3 M HCl was added to precipitate the polymer which was then centrifuged at 3900 RPM and washed several times with DI water to remove excess HCl. The resulting powder was then dried and crushed to form the amine modified polymer reagent.

Water Solubilization of Anionic Nanocrystals.

10 mg of nanocrystals having $\lambda_{max}$ of 555 nm (NC555), dried by vacuum, in 20 mL of chloroform were added dropwise to a stirring solution of 60 mg of amine modified polymer in 20 mL of chloroform and stirred for 0.5 hours before the chloroform was removed by vacuum. 10 mL of pH=9 borate buffered solution was added to the dried polymer coated nanocrystals to redisperse and store them as a stock solution (1 mg/ml of nanocrystals in buffered aqueous solution).

Water Solubilization of Cationic Nanocrystals.

Approximately 2 mg of nanocrystals having $\lambda_{max}$ of 570 nm (NC570), dried by vacuum then dispersed in 100 μL of hexane, were added to 50 μL of DHLA-amino-PEG in 100 μL of methanol and stirred at r.t. for 45 min before adding 2 mL of ethanol and 2 drops of chloroform to stabilize the particles before precipitating them with hexane. The particles were then centrifuged at 3900 RPM and the supernatant discarded before redispersing the nanocrystals in 2 mL of DI water to form a stock solution (~1 mg/mL of nanocrystals in water).

Formation of NC/J-Aggregate Using Cationic TTBC.

In a glass vial, 0.2 mL of a solution of 0.1 mg/mL TTBC in methanol was added to 0.5 mL of methanol. 0.1 mL of stock solution of anionic polymer coated NC555 (1 mg/mL nanocrystals in buffered aqueous solution) was added to the vial for the monomer to associate to the nanocrystals prior to aggregation. 5 mL of DI water was then added quickly to the vial to cause the TTBC to aggregate.

Formation of NC/J-Aggregate Using Anionic BIC.

In a glass vial, 0.2 mL of a solution of BIC (0.1 mg/mL in water) was added to 0.1 mL of stock solution of DHLA-amino-PEG coated NC570 (~1 mg/mL in water) and 2 mL of DI water. One to two drops of concentrated NaCl solution were then added to cause immediate aggregation of the BIC onto the nanocrystals.

Transient Photoluminescence.

Samples were excited with 400 nm or 570 nm pulses obtained by second harmonic generation or optical parametric amplification (Coherent OPA) of a 250 kHz amplified Ti:sapphire laser (Coherent RegA 9000). Emission was dispersed with a spectrometer (Acton) and time resolved with a streak camera (Hamamatsu C5680).

Förster Resonant Energy Transfer (FRET) Calculations.

The FRET rate from a spherical donor (i.e., the nanocrystal) to a surrounding shell of acceptors (i.e., the J-aggregates) extending from inner radius $R_1$ to outer radius $R_2$ is given by:

$$\Gamma_{ET} = \frac{1}{\tau_D}\left(\frac{R_F}{\sqrt{R_1 R_2}}\right)^6 N_A \quad (1)$$

Where $R_F$ is the characteristic FRET radius of a single donor/acceptor pair using the standard Förster formalism, $\tau_D$ is the donor lifetime prior to conjugation, and $N_A$ is the number of acceptors within the shell. The FRET rate can be inferred from the energy transfer efficiency, E:

$$E = 1 - \frac{\int PL_{DA}(E)dE}{\int PL_D(E)dE} = 1 - \frac{\tau_{DA}}{\tau_D} = \frac{\Gamma_{ET}}{1/\tau_D + \Gamma_{ET}} \quad (2)$$

Where $PL_{DA}(E)$ and $PL_D(E)$ correspond to the donor PL spectrum in the presence and absence, respectively, of the acceptors, and likewise $\tau_{DA}$ is the donor lifetime in the presence of the acceptors.

Emission, Absorption and PLE Spectra.

Figure 3:
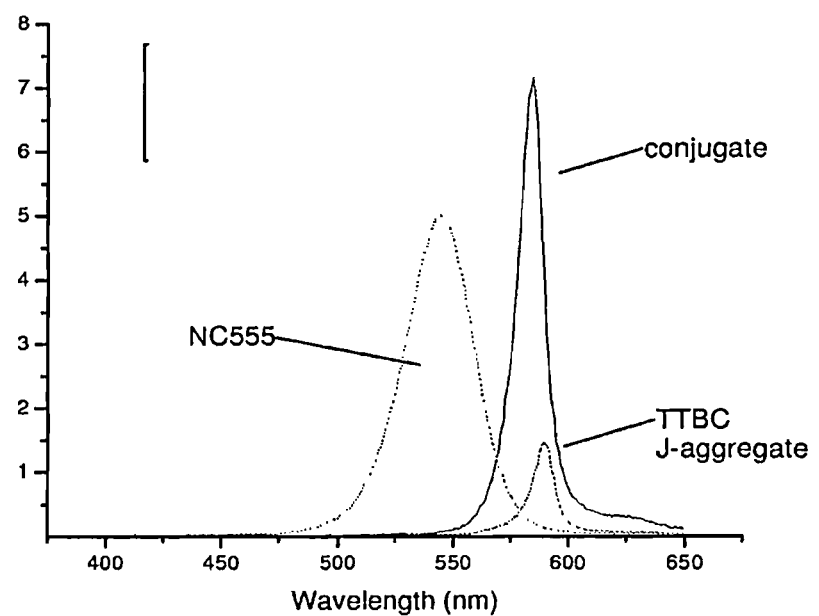
FIG. 3 is a graph depicting optical properties of different materials.
Figure 4:
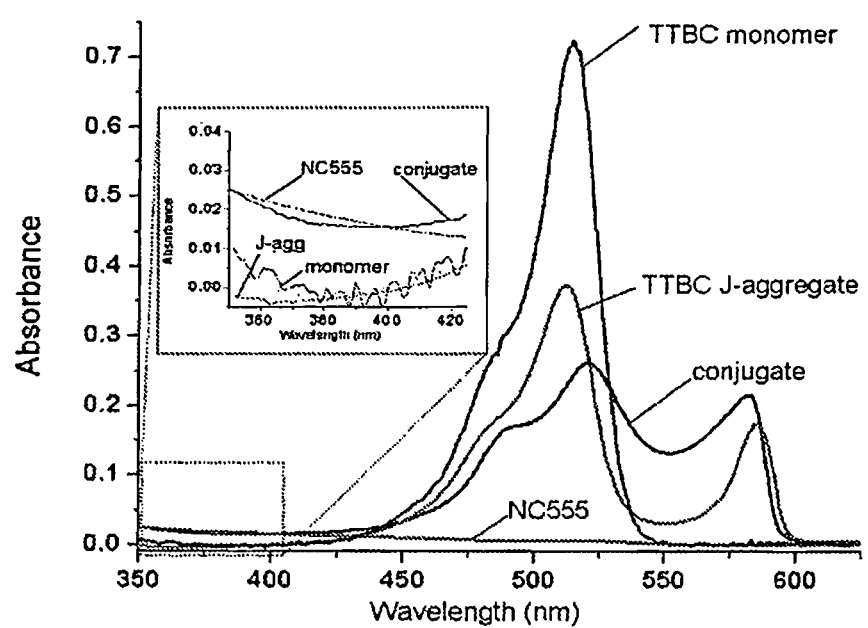
FIG. 4 is a graph depicting optical properties of different materials.

FIG. 3 presents emission spectra of the nanocrystal/J-aggregate construct ("conjugate"), nanocrystals alone ("NC555") and TTBC aggregated in the absence of the nanocrystals ("TTBC J-aggregate"). The construct has a narrowband emission at the wavelength of J-aggregate emission, but more intense than the J-aggregate emission. The conjugate emitted light at λ=585 nm with a FWHM of 12 nm, when excited in the UV. The nanocrystal emission was almost completely quenched by the dye aggregates and the emission intensity of the solution was significantly larger than for dye aggregated in the absence of nanocrystals, with identical monomer concentrations (see, e.g., FIG. 6). The quantum yield of the construct was measured to be 40% when excited at 365 nm using a reference sample of nanocrystals (QY=70%) emitting at ~590 nm, which were in turn calibrated using rhodamine 610 (QY=95% in methanol) as a reference. The absorption spectrum of the constructs show as nanocrystal and J-band absorption features. The J-band of the construct is slightly blue-shifted and broadened compared to the J-band of dyes aggregated in the absence of nanocrystals (FIG. 4). FIG. 4 presents absorption spectra of the monomer dye (TTBC monomer), the aggregated dye in the absence of nanocrystals (TTBC J-aggregate), the nanocrystal/J-aggregate construct (conjugate), and of the nanocrystals at sample concentration ~10 nmol L$^{-1}$ (NC555). FIG. 4(inset) presents a portion of the absorption spectrum from FIG. 4 highlighting the increased absorption imparted to the construct (conjugate) in the UV excitation region of 320-420 nm, by the nanocrystals (NC555) over that of dye aggregated in the absence of nanocrystals (J-agg). These discrepancies were likely due to the difference in size of the aggregate formed on the nanocrystals as opposed to those formed independently of the nanocrystals. However, it is also possible that the dye emission was solvatochromically shifted, to some degree, due to the different local field environment of the negatively charged polymer as opposed to that of the solution. There was also a significant contribution of what appears to be monomer dye absorption after the aggregation steps are performed. The increased absorption of the construct due to the nanocrystals as shown in FIG. 4 (inset) is responsible for the increased PL of the construct at excitation wavelengths shorter than 400 nm.

Figure 5:
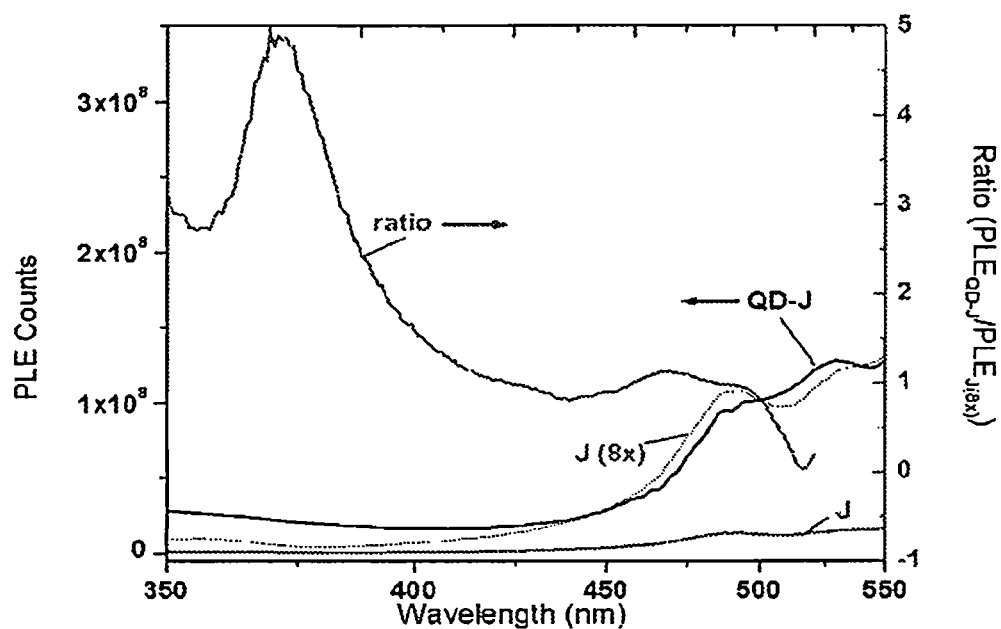
FIG. 5 is a graph depicting optical properties of different materials.

Evidence of FRET was also seen in the PLE spectra (FIG. 5), further confirming the close association of the nanocrystal and J-aggregates. The relative intensity of J-aggregate emission at the J-band peak (585 nm for the construct and 594 nm for the aggregate alone) was significantly increased during UV excitation in the case of the construct, up to 25 times at wavelengths between 350-400 nm. The UV excitation created excitons in the nanocrystals, which then transfer to the J-band of the J-aggregate, quenching the PL intensity of the nanocrystals but increasing that of the J-aggregate. The relatively low optical density (~0.3) of the solution at 555 nm and the low emission intensity of non-conjugated J-aggregates when excited in the UV, insures that the J-band emission observed cannot be attributed to absorption and re-emission of photons from nearby nanocrystals or to direct UV excitation of the J-aggregates.

Electrostatic Assembly of Nanocrystal/J-Aggregate Constructs.

Addition of water to the nanocrystal/monomer solution causes aggregation of the dye onto the nanocrystal as illustrated in FIG. 2. Prior to aggregation, no FRET was observed, due to a combination of (i) smaller spectral overlap between the nanocrystal donor and the dye monomer acceptors, and (ii) weaker association between the monomers and the polymer shell around the nanocrystals. Conjugation was driven by electrostatic attraction of opposite charges on the dye and the nanocrystal coating. This was evident from the observation that FRET pairs form only when the nanocrystal and the J-aggregate were oppositely charged, but not when they were both negatively charged. In the latter case, emission from both the nanocrystal and the aggregate were seen simultaneously, and the independent lifetimes of each were spectrally resolved.

The size of the aggregates formed in the construct species were estimated by comparing hydrodynamic radii of the nanocrystals before and after the aggregation step using dynamic light scattering (DLS) measurements. DLS revealed no significant change in size, despite the presence of attached aggregates, as indicated from FRET. Two factors contributed to these observations. First, the aggregates formed were in the presence of nanocrystals were much smaller than those formed in the absence of nanocrystals, thus falling within the standard deviation of the measurement (~2 nm). Second, the addition of positively charged dye molecules decreases the overall negative charge of the construct, which resulted in a smaller size for the solvation shell around the construct. Furthermore, if the boundary between the polymer and solution was diffuse, dye aggregates could be embedded within the polymer shell. Considering the measurement error (±2 nm) and the size of the polymer shell (~4 nm), it can be surmised that the aggregates must be less than 6 nm in length, on average.

Dynamic light scattering measurements determined the following radii: nanocrystals, 6.4 nm; J-aggregate, 89.6 nm; construct, 13.5 nm. In a separate measurement, the radii determined were: nanocrystals, 5.9 nm; J-aggregate, 49 nm; and construct, 9.3 nm.

A lower bound for the size of the J-aggregates was established by estimating the area across which the exciton is delocalized. This area, known as the coherence domain, is described by the number of participating molecules, $N_c$, and is given by the expression:

$$N_c = (\Delta M / \Delta J)^2 \qquad (4)$$

where $\Delta M$ and $\Delta J$ are the FWHM of the absorption peaks of the J-aggregate and monomer, respectively. See, e.g., Knapp, E. W.; et al., *Chemical Physics Letters* 1984, 111, 481-486, which is incorporated by reference in its entirety. From the absorption as spectra, it was determined that $N_c > 5$ molecules, setting a lower bound of ~1 nm for the size of the aggregates. In contrast, large aggregates which are 55 nm in hydrodynamic radius were measured by DLS when formed in the absence of nanocrystals. Thus the available anionic carboxylic acid sites on the nanocrystal appeared to serve as nucleation points for J-aggregate formation, resulting in many more J-aggregates of significantly smaller size.

Aggregating in the presence of the oppositely charged nanocrystals also conferred a greater degree of stability to the J-aggregate compared to those formed in the absence of nanocrystals. Unlike free aggregates in solution, J-aggregates in the nanocrystal/aggregate construct could be diluted several times without redissolving, indicating a stronger attachment of the monomers within the aggregates bound to the nanocrystal. Filtering the construct with a 300 kDa cutoff filter released very little a monomeric dye, and no J-aggregates, suggesting that the interaction is stable. Serial dilution of the construct resulted in proportional reductions in photoluminescent intensity; whereas dilution of a J-aggregate results in greater than proportional reductions, as the aggregate disassembles.

Figure 6:
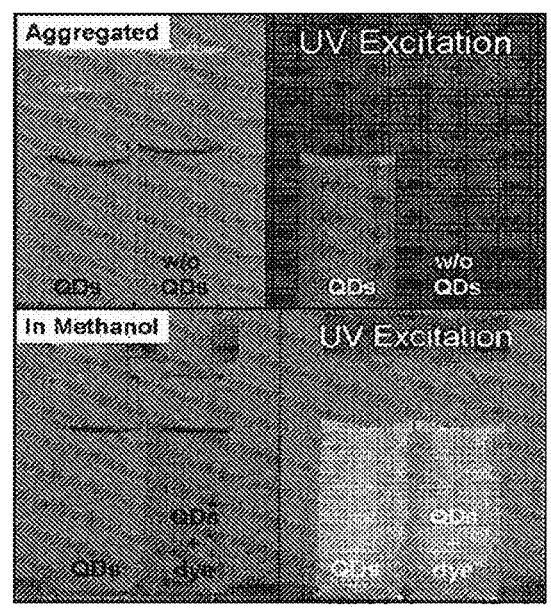
FIG. 6 are photographs illustrating absorption and photoluminescent behavior of different materials.

FIG. 6 shows photos of vials of J-aggregates prepared in the presence (lefthand vial in each image) and absence (righthand vial in each image) of nanocrystals under room lights (left panels) and under UV excitation (right panels). In the upper panels, the dye is in aggregated form (i.e., aqueous solution), whereas in the lower panels, the dye remains in monomer form (i.e., methanolic solution).

Transient Photoluminescence.

While the steady state spectroscopic measurements point to FRET and hence close conjugation of the nanocrystal and J-aggregates, fluorescence lifetime measurements (FIG. 8) are required to confirm these conclusions. To do so, the nanocrystal and the dye aggregate were excited separately and the J-band emission collected in each case in order to confirm the occurrence of FRET and to estimate the FRET rate.

Figure 7:
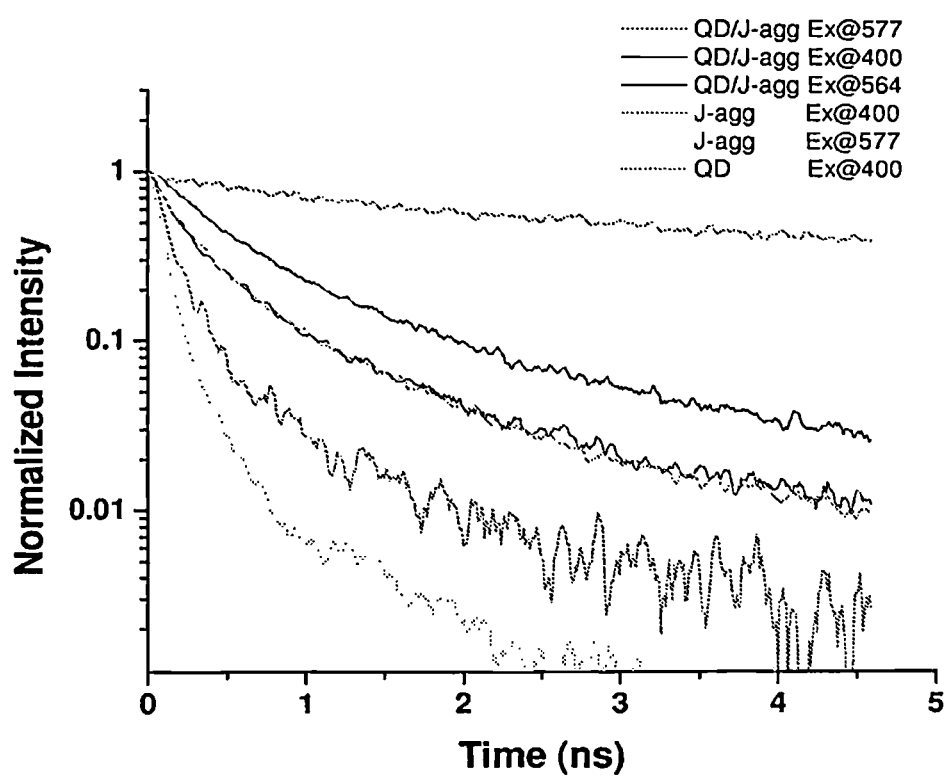
FIGS. 7-8 are graphs depicting optical properties of different materials.

FIG. 7 shows lifetime measurements for (in order of decreasing lifetime) nanocrystals; construct excited at 400 nm; construct excited at 564 nm; construct excited at 577 nm; J-aggregate excited at 400 nm; and J-aggregate excited at 577 nm.

Figure 8:
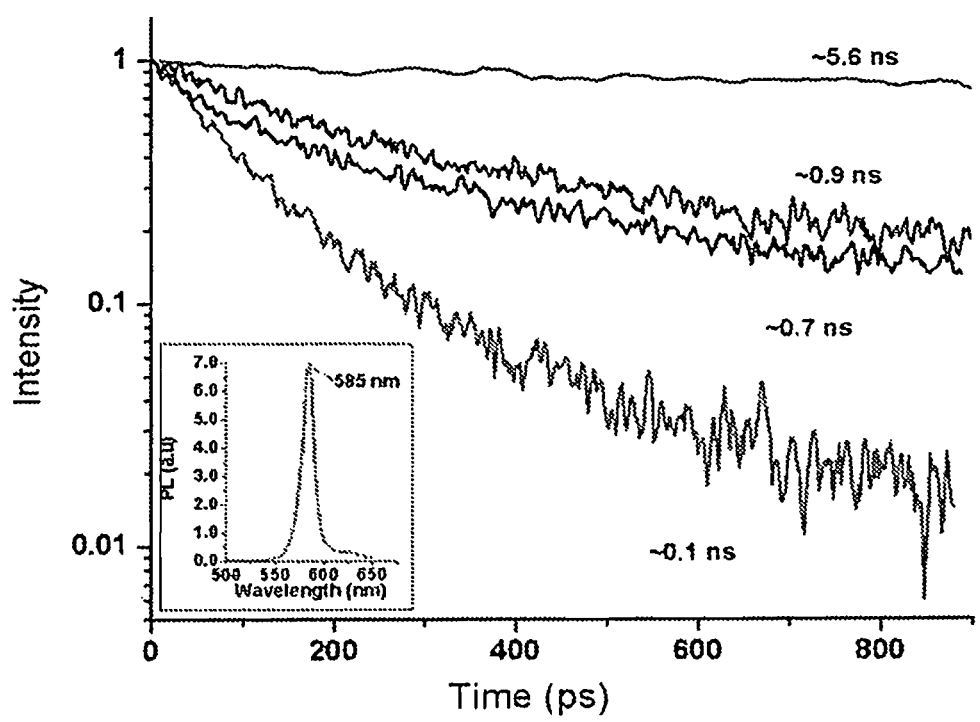

The decay curves in FIG. 8 were plotted for 570 nm excitation of TTBC aggregated in the absence of nanocrystals (~0.1 ns) and nanocrystal/J-aggregate conjugates (~0.7 ns), as well as for 400 nm excitation of the nanocrystal/J-aggregate conjugate (~0.9 ns) and the nanocrystals with no dye present (~5.6 ns).

The fluorescence lifetime of the construct was found to be ~700 ps when excited at 570 nm (direct excitation of the J-aggregate), while that of the non-conjugated J-aggregates is ~100 ps. The difference in rate between these two species supports the conclusion that construct J-aggregates are indeed significantly smaller than those formed separately, in agreement with the earlier DLS conclusions. Meanwhile, the lifetime of the construct excited at 400 nm (where nanocrystal absorption is dominant) was 900 ps while that of the non-conjugated nanocrystal was 5.6 ns (measured at the peak of the nanocrystal emission). As expected, there was no indication of absorption and re-emission, where the emission at the J-band would follow the lifetime of the nanocrystal. That the fit lifetimes of the construct excited at both 400 nm (exciting the nanocrystals) and 570 nm (exciting the J-aggregates) were so close in value indicates that the FRET rate must be fast relative to the lifetime of the acceptor (i.e., the J-aggregate). The lack of an observable risetime within the resolution of the instrument (~50 ps) indicates that the FRET rate must be at least that fast.

FRET Rate Calculations.

The FRET rate, $\Gamma_{ET}$, can be determined based on the PL quenching of the nanocrystal emission. In the presence of TTBC acceptors, the PL intensity of the nanocrystal spectrum was reduced by a factor of 100 or more. Using equation (2), the quenching efficiency, E, was at least 99%, and equivalently, the FRET rate was at least 99 times faster than the nanocrystal lifetime of 5.61 ns. Hence the "lifetime" associated with the FRET process, $1/\Gamma_{ET}$, was at most 57 ps. This timescale agrees with the observations found by transient photoluminescence in which the rise time of the PL decay was less than 50 ps (the resolution of the instrument).

This FRET rate was also consistent with the transfer rate calculated from first principles using equation (1). In this approach, the $R_F$ that describes the process of energy transfer from the nanocrystal donor to a single conjugated TTBC acceptor is determined. $R_F$ was given by calculating the overlap integral of the PL spectrum from the nanocrystals with the absorption spectrum of the TTBC. In the overlap integral, both the monomer and J-aggregate features of the absorption spectrum were included to account for energy transfer occurring to either species since both forms of TTBC were likely bound to the nanocrystals. The Förster radius for FRET from a nanocrystal to a single conjugated TTBC acceptor that was in either monomeric or J-aggregate form from this calculation gives $R_F$=5.1 nm.

To complete the calculation of the net transfer rate using equation (1), a few parameters characterizing the nanocrystal/J-aggregate constructs are required. The number $N_A$ of TTBC acceptors conjugated to each nanocrystal was determined from optical absorption and dilution experiments. Based on the absorption cross section of each species, the ratio of TTBC to nanocrystals in the solutions was 150 dye molecules per nanocrystal. Hence, the number of conjugated acceptors per donor is $N_A$=150, provided that all the dye remaining after filtration was presumed to be attached to the nanocrystal. From TEM of the nanocrystals, $R_1$=3.5 nm was calculated by adding the average nanocrystal radius of 2.8 nm to the estimated size of the decylamine capping ligands (~0.7 nm). DLS measurements provide the hydrodynamic radius of the constructs, giving $R_2$=8.0 nm.

Equation (1) was used to determine the net FRET rate. $R_F$ was 3.6% smaller than the geometric scale-factor $\sqrt{R_1 R_2}$, meaning the net transfer rate was dominated by $N_A$, the number of conjugated TTBC molecules per nanocrystal. This translates into a net transfer rate that was 120 times faster than the nanocrystal PL process. From streak camera measurements, $\tau_D$=5.61 nsec, hence the first principles calculation yielded a transfer "lifetime" of $1/\Gamma_{ET}$=47 ps, in agreement with experimental observations using PL.

Results for Nanocrystal/BIC Construct.

Figure 9A:
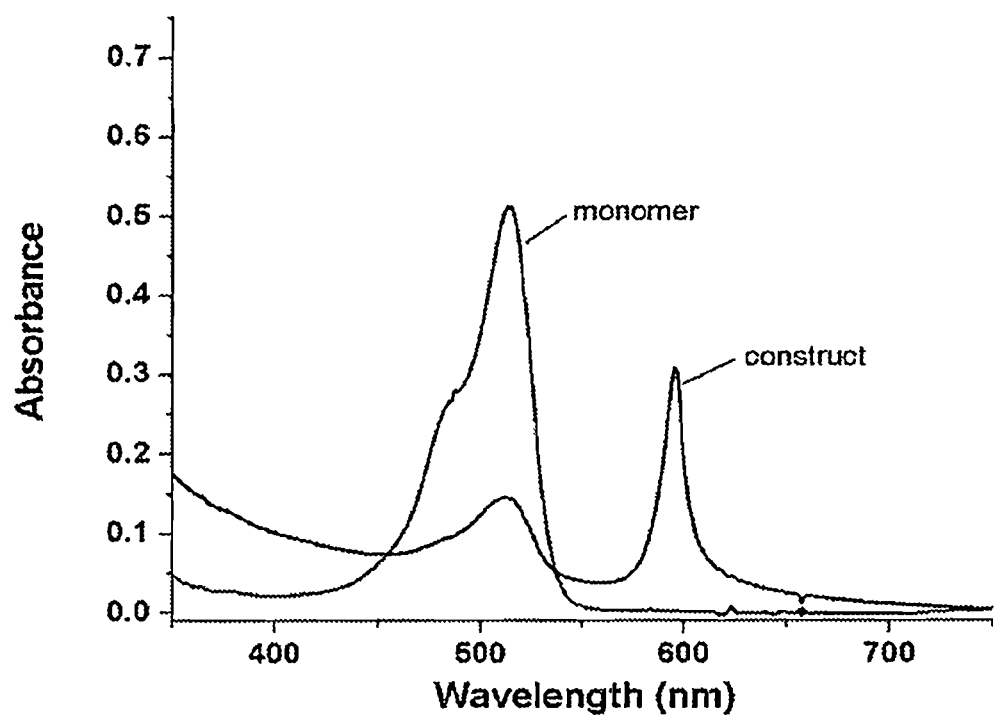
FIGS. 9A-9C are graphs depicting optical properties of different materials.
Figure 9B:
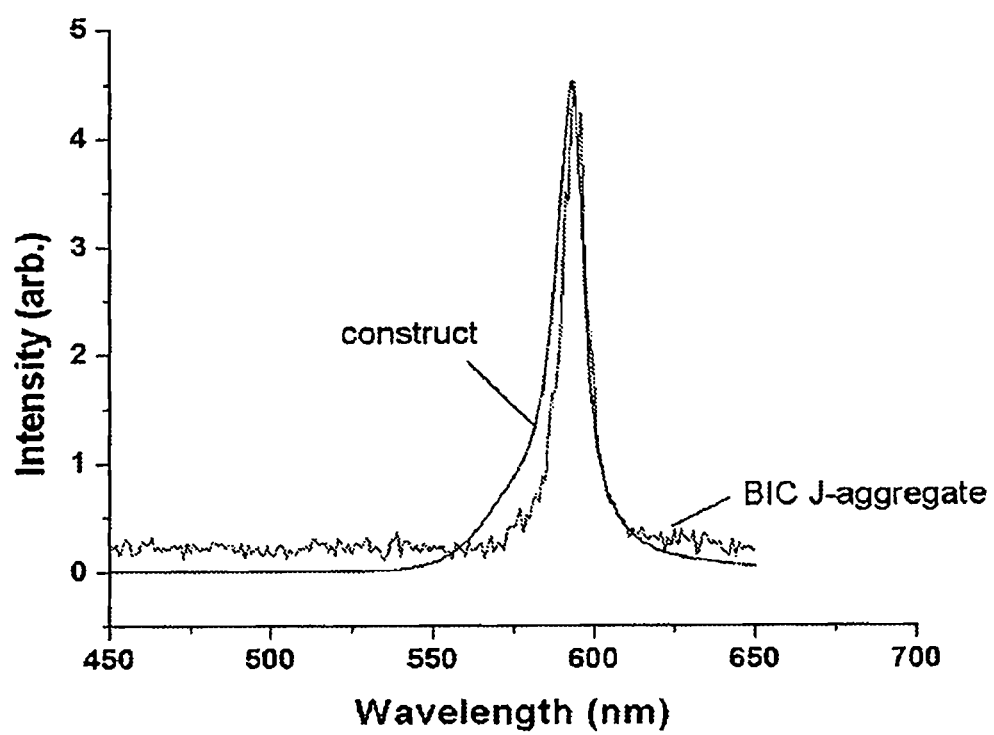

A negatively charged dye, BIC, was coupled to a positively charged, aminoPEG coated nanocrystal to examine the generality of electrostatic assembly. For this BIC(−)/nanocrystal(+) system, nearly identical FRET characteristics were observed as those in the TTBC(+)/nanocrystal(−) system. The absorption spectrum of the conjugate species in FIG. 9A shows that the BIC dye has in fact aggregated in solution from the appearance of the characteristic J-band peak. Once conjugated to the nanocrystal, the emission of the nanocrystals was completely quenched. As can be seen in FIG. 9B, the emission spectrum of the conjugate was completely dominated by emission from the BIC aggregate, which has a FWHM of 12 nm. BIC aggregated at significantly lower salt concentrations in the presence of the nanocrystals than without. The overall enhancement of the conjugate emission over that of the aggregate alone was nearly a factor of 100, due to the increased absorption of the conjugate species at 400 nm and the greater number of aggregate species formed in the presence of the nanocrystals.

Figure 9C:
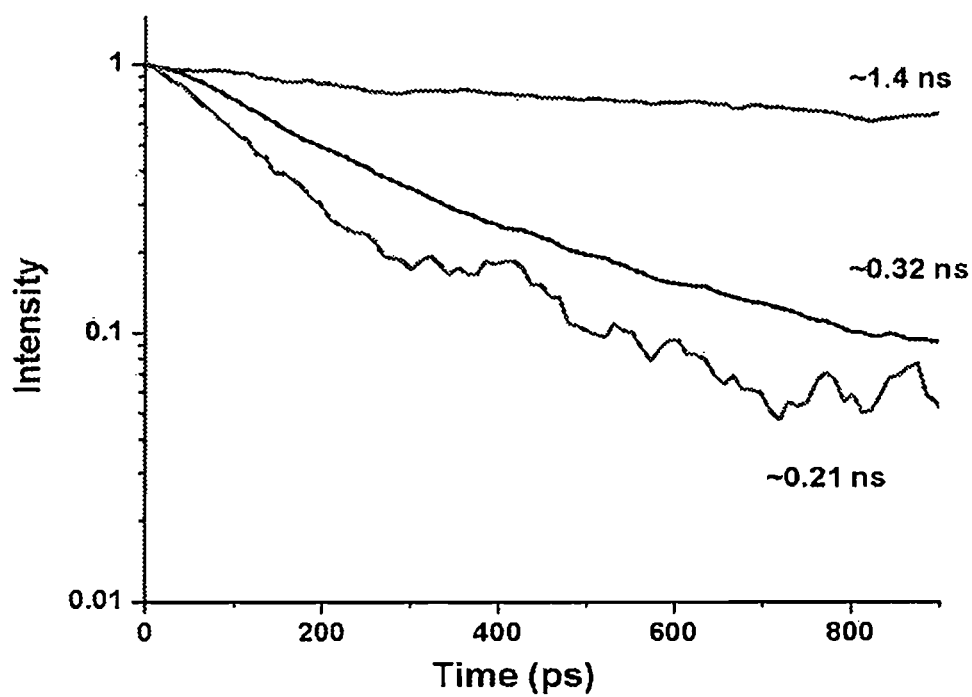

The PL lifetime decay (FIG. 9C) for the construct species showed no nanocrystal emission and a fast risetime (resolution limited) of the construct lifetime curve coupled with a decay constant similar to that of the J-aggregate alone. The nanocrystal lifetime (~1.4 ns) was observed to be very long compared to that of the dye aggregated onto the nanocrystal in the construct (~0.32 ns) and the dye aggregated in the absence of nanocrystals (~0.21 ns). Once again no rise was observed in either peak, and the lifetime of the aggregate dye was nearly equivalent in both cases indicating a transfer rate faster than the resolution of the instrument (~50 ps).

As in the case of the TTBC/nanocrystal construct, this indicated that the FRET rate was much faster than the acceptor excited state lifetime. Thus the TTBC/nanocrystal system is not unique to a specific dye or ligand system for dispersing nanocrystals in water.

Other embodiments are within the scope of the following claims.

What is claimed is:

1. A composition comprising:
   a first moiety capable of absorbing a first wavelength of light and emitting a second wavelength of light; and
   a second moiety capable of absorbing a third wavelength of light and emitting a fourth wavelength of light;
   wherein the first and second moieties are associated electrostatically, and wherein the first moiety or the second moiety includes a polycation or a polyanion,
   wherein the first moiety or the second moiety includes a plurality of the same monomers that is a J-aggregate.

2. The composition of claim 1, wherein the first moiety is a semiconductor nanocrystal.

3. The composition of claim 1, wherein the second moiety is a J-aggregate.

4. The composition of claim 2, wherein the second moiety is a J-aggregate.

5. The composition of claim 1 wherein:
the first moiety is capable of being excited to an excited state; and
the second moiety capable of accepting excited state energy from the first moiety;
wherein the second moiety is capable of emitting light with a FWHM of 15 nm or less when excited.

6. The composition of claim 1 wherein:
the second moiety is capable of being excited to an excited state; and
the first moiety capable of accepting excited state energy from the second moiety;
wherein the second moiety is capable of emitting light with a FWHM of 15 nm or less when excited.

7. The composition of claim 1 wherein the first moiety has an excited state; and the second moiety accepts excited state energy from the first moiety.

8. The composition of claim 1 wherein the second moiety has an excited state; and the first moiety accepts excited state energy from the second moiety.

9. A composition comprising: a first moiety capable of being excited to an excited state; and a second moiety capable of accepting excited state energy from the first moiety, and wherein the first moiety or the second moiety includes a polycation or a polyanion, wherein the first moiety or the second moiety includes a plurality of the same monomers that is a J-aggregate.

* * * * *